US007073850B2

(12) United States Patent
Erney et al.

(10) Patent No.: US 7,073,850 B2
(45) Date of Patent: Jul. 11, 2006

(54) SEPARATING DEVICE FOR THE BODYWORK OF A VEHICLE

(75) Inventors: Thomas Erney, Boeblingen (DE); Daniela Seitz, Stuttgart (DE); Johann Seefried, Eutingen (DE)

(73) Assignee: DaimlerChrysler AG, Stuttgart (DE)

( * ) Notice: Subject to any disclaimer, the term of this patent is extended or adjusted under 35 U.S.C. 154(b) by 36 days.

(21) Appl. No.: 10/491,605

(22) PCT Filed: Aug. 24, 2002

(86) PCT No.: PCT/EP02/09494

§ 371 (c)(1), (2), (4) Date: Jan. 5, 2005

(87) PCT Pub. No.: WO03/031251

PCT Pub. Date: Apr. 17, 2003

(65) Prior Publication Data

US 2005/0104417 A1 May 19, 2005

(30) Foreign Application Priority Data

Oct. 5, 2001 (DE) ................................ 101 49 245

(51) Int. Cl.
*B62D 25/08* (2006.01)

(52) U.S. Cl. ................. 296/203.04; 280/834; 296/24.4

(58) Field of Classification Search ........... 296/203.04, 296/24.4; 280/834

See application file for complete search history.

(56) References Cited

U.S. PATENT DOCUMENTS 2,860,912 A * 11/1958 Barenyi ..................... 296/24.4
5,195,780 A 3/1993 Inoue et al.
5,788,322 A 8/1998 Wolf et al.
6,286,896 B1 9/2001 Eipper et al.
6,443,518 B1 9/2002 Rohl et al.

FOREIGN PATENT DOCUMENTS

DE 19642820 A1 6/1997
DE 19749294 C1 4/1999
DE 19843025 C1 4/2000
EP 0915007 A2 5/1999
GB 746584 3/1956

OTHER PUBLICATIONS

Partial copy of International Preliminary Examination Report previously filed Apr. 2, 2004, with English translation.

Copy of Office Action dated Jul. 9, 2004, in German application 101 49 245.6, with partial English translation.

* cited by examiner

*Primary Examiner*—Dennis H. Pedder
(74) *Attorney, Agent, or Firm*—Crowell & Moring LLP

(57) ABSTRACT

A separating arrangement for the self-supporting bodywork of a motor vehicle has a partition which is arranged at the front end of a rear compartment, extends in the transverse direction of the vehicle and over part of its height between rear wheel houses of the motor vehicle and is fastened to boundary walls of the rear compartment. The separating arrangement is designed as a supporting device which strengthens the bodywork against distortion. The separating arrangement is curved in relation to a vertical transverse plane of the vehicle and a horizontal transverse plane of the vehicle, and the separating arrangement has reinforcing struts in the form of greater material thickness along force flow lines.

31 Claims, 1 Drawing Sheet

SFQ
Z
Y
X
2
8
9 4 14
10 12
7 12 6 16
WFQ

SEPARATING DEVICE FOR THE BODYWORK OF A VEHICLE

BACKGROUND AND SUMMARY OF THE INVENTION

This invention relates to a separating arrangement.

The "bodywork stiffness" is increasingly regarded as one of the most important criteria for modern motor vehicles. It makes a decisive contribution to safety, high-quality appearance and comfort. However, the increase in the bodywork stiffness is often associated with an increase in the vehicle weight, since a number of measures are frequently associated with additional or stronger bodywork components.

German document DE 198 43 025 C1 describes the possibility of increasing the bodywork stiffness while reducing the mass using a component used as standard, a dividing wall of the fuel tank. The dividing wall is of flat configuration and is virtually parallel to a vertical transverse plane of the vehicle. Angled elements and rails, with which the separating arrangement is fastened releasably to the bodywork, are in turn fastened to the dividing wall. In addition, the separating arrangement has cross-shaped cross-struts which are fitted on the separating arrangement or are integrated as a U-profile in the component.

U.S. Pat. No. 5,195,780 describes an approximately box-shaped arrangement which surrounds the fuel tank and is connected to the bodywork, this arrangement likewise contributing to stiffening the bodywork.

German document DE 196 42 820 A1 discloses a rear end of a vehicle, in particular for a convertible, which is configured in such a manner that the forces which are introduced via the chassis and via a crossmember into a central force flow center point are conducted further. The forces are distributed from there into a plurality of supports which are arranged in a manner similar to a lattice-type structure. However, the arrangement is not optimized in respect of a reduction in weight.

An object of the invention is to design a separating arrangement of a motor vehicle rear compartment in such a manner that the bodywork stiffness is increased in comparison with the prior art with a simultaneous reduction in mass.

The object is achieved according to the invention.

A novel separating arrangement according to the invention is fitted releasably in the front part of a rear compartment of a motor vehicle. It serves inter alia to partition off a fuel tank compartment from the rear compartment. The separating arrangement is positioned in such a manner that it is curved in relation to a vertical transverse plane of the vehicle (SFQ) and a horizontal transverse plane of the vehicle (WFQ). The separating arrangement is preferably curved concavely in relation to these planes but, given an appropriate distribution of space between the fuel tank compartment and rear compartment, a convex curvature may also be expedient. The curvature increases the bodywork stiffness in comparison with the prior art.

A further novel feature is that the separating arrangement has increased material thickness along the calculated force flow lines. Accordingly, material may be saved outside the force flow lines, this leading to a reduction in weight while simultaneously increasing the stiffness. The force flow lines are calculated for the corresponding bodywork with reference to standard loading situations (e.g. torsion and bending of the bodywork) with the aid of the finite element method. According to the invention, the force flow line profile is applied to the separating arrangement.

In a further advantageous refinement, the separating arrangement has, at its edges, fastening surfaces which are formed approximately parallel to the vertical or horizontal transverse planes of the vehicle. This results in a greater compensation of tolerance in two directions in space during the assembly of the body shell.

The use of elongated holes in the fastening planes additionally results in a compensation of tolerance in the third direction in space.

The separating arrangement is preferably fastened directly to the vehicle bodywork by screwing. Additional elements, such as angled components and rails, may be omitted. The number of screws is reduced. This measure contributes to the reduction in weight.

A further reduction in weight can be effected by the separating arrangement being produced in a light metal casting, in particular diecasting. Diecasting is understood here to mean all types of casting in a permanent casing die at increased pressure, for example diecasting, squeeze casting, thixocasting, thixomolding, vario-casting or low-pressure chill casting. Sandcasting processes or gravity chill casting are possible, but are not always expedient because of cost.

The abovementioned casting processes make it possible to fashion the separating arrangement according to the invention from light metals and, in particular, to vary the wall thicknesses in accordance with the invention. This results in a lower component weight and in a higher bodywork stiffness. Suitable casting metals are aluminum alloy and magnesium alloy and what is referred to as AZ91.

The reduction in weight is likewise assisted by designing the wall thicknesses between the reinforcing struts to be as thin as possible, i.e. as thin as permitted by current casting technology. At the said locations, the wall thickness is approximately 1.5 mm or less. At the present time, wall thicknesses of 1.2 mm can be reliably fashioned by casting techniques.

It is particularly expedient with regard to the reduction in weight to design the regions between the reinforcing struts to be free from material. However, this requires an additional working step and possibly an additional punching tool. The expediency of this measure is calculated in an individual case by an analysis of the cost-effectiveness.

A releasable fastening of the separating arrangement permits maintenance work in a fuel tank compartment covered by the separating arrangement.

BRIEF DESCRIPTION OF THE DRAWINGS

Preferred embodiments of the invention are illustrated in the following figures, in which.

DETAILED DESCRIPTION OF THE INVENTION

Figure 1:
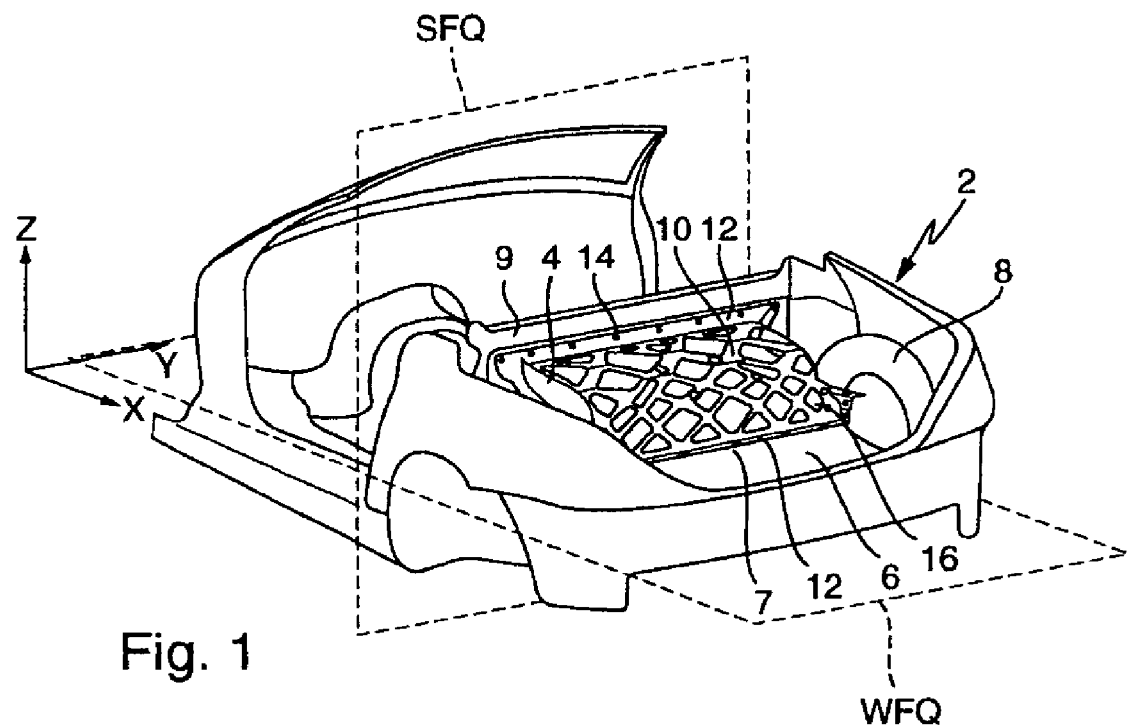
FIG. 1 shows the rear end of a self-supporting bodywork with a separating arrangement in a perspective view.

The detail illustrated in FIG. 1 of the self-supporting bodywork 2 comprises a rear compartment 6 which is separated from a fuel tank compartment (not illustrated specifically) by means of a separating arrangement 4. The separating arrangement 4 extends from a base 7 of the rear compartment 6 as far as a crossmember 9 and between two wheel houses 8, of which only the right-hand one can be seen in the perspective illustration. The separating arrangement 4 has a curvature in relation to a horizontal transverse plane of the vehicle WFQ and a vertical transverse plane of the vehicle SFQ.

Figure 2:
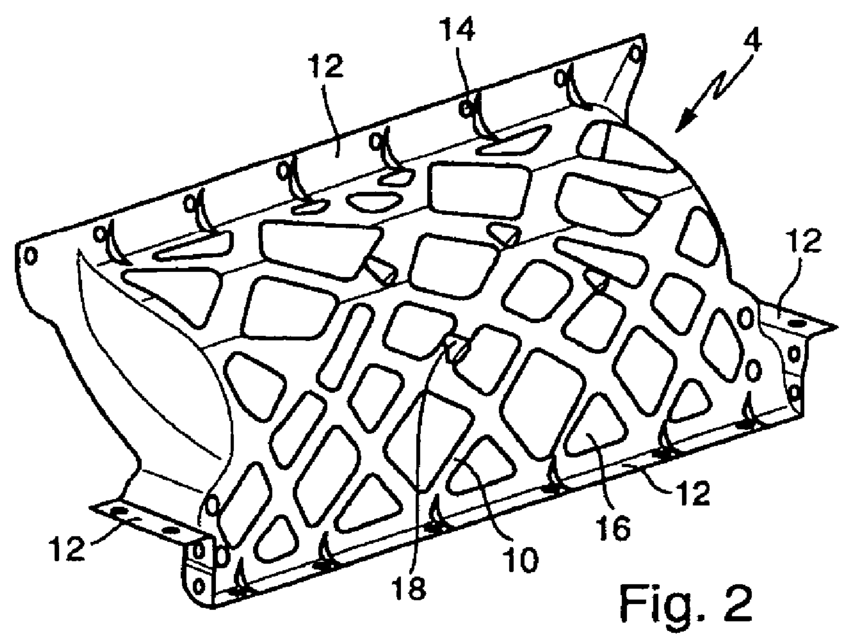
FIG. 2 shows a perspective view of a separating arrangement.

A detailed illustration of the separating arrangement 4 is provided by FIG. 2. The curvature of the separating plane is designed concavely in relation to the WFQ and the SFQ, this bringing about an enlargement of the fuel tank compartment. The separating arrangement 4 has reinforcing struts 10 which correspond to the force flow directions, which are dependent on the type of vehicle.

The reinforcing struts 10 concern reinforcements of the material in comparison with the rest of the wall thickness. The reinforcement of the material can be fashioned very readily in a casting process, since locally greater wall thicknesses can be reproduced by the form tool. The reinforcing struts 10 have a cross section, the width to height ratio of which is greater than 1; this ratio is preferably greater than 4. The reinforcing struts 10 are therefore to be referred to as flat, this having an advantageous effect on their profile over the curvature. High reinforcing struts would run the risk, when subjected to load, of buckling over the curvature.

Cutouts 16 which are worked mechanically from the separating arrangement 4 after a production process by means of diecasting are situated between reinforcing struts 10. In this case, the cutouts 16 in FIGS. 1 and 2 are purely exemplary. Only the reinforcing struts 10 are emphasized more clearly by this illustration. According to the invention, the gaps between the reinforcing struts 10 may also consist of material of thin wall thickness, preferably of 1.5 mm or less.

For assembly purposes, the separating arrangement 4 has fastening surfaces 12 which run approximately parallel in relation to the WFQ and the SFQ. These surfaces 12 which are "parallel to the network" permit a compensation of tolerance during the assembly in an x- and z-direction (see system of coordinates in FIG. 1). Elongated holes 14 which permit an additional compensation of tolerance in the y-direction are incorporated into the fastening surfaces 12.

The arrangement described of the fastening surfaces 12 and of the elongated holes 14 makes it possible to omit further auxiliary means for fastening the separating arrangement 4. The separating arrangement 4 is screwed directly to the bodywork 2. A permanent connection between separating arrangement 4 and bodywork 2 is conceivable but not expedient in most cases since the fuel tank compartment should be accessible.

The separating arrangement in FIG. 2 additionally has installation devices 18 for the integration of electronic components. The installation devices 18 are configured in the form of raised parts which can already be provided with holes during the casting process by means of sliders. This measure enables additional auxiliary fastening means and the provision of holes to be omitted, which saves additional working steps, material costs and weight. The installation devices are configured in such a manner that the desired positioning of the electronic components is ensured.

The invention claimed is:

1. A separating arrangement for the self-supporting bodywork of a motor vehicle, comprising a partition which is arranged at a front end of a rear compartment, extends in a transverse direction of the vehicle and over part of its height between rear wheel houses of the motor vehicle, and is fastened to boundary walls of the rear compartment, wherein the separating arrangement is designed as a supporting device which strengthens the bodywork against distortion, wherein the separating arrangement is curved concavely in relation to a vertical transverse plane of the vehicle and a horizontal transverse plane of the vehicle and partitions off the rear compartment from a fuel tank compartment, and wherein the separating arrangement has reinforcing struts in the form of a greater material thickness along calculated force flow lines.

2. The separating arrangement as claimed in claim 1, wherein the separating arrangement has fastening surfaces which are parallel in relation to the vertical transverse plane of the vehicle and in relation to the horizontal transverse plane of the vehicle.

3. The separating arrangement as claimed in claim 2, wherein the fastening surfaces are provided with elongated holes.

4. The separating arrangement as claimed in claim 1, wherein the separating arrangement is fastened directly to the vehicle bodywork.

5. The separating arrangement as claimed in claim 1, wherein the separating arrangement is fashioned from a light metal diecasting.

6. The separating arrangement as claimed in claim 1, wherein a wall thickness between the reinforcing struts is less than 1.5 mm.

7. The separating arrangement as claimed in claim 1, wherein regions between the reinforcing struts are left open.

8. The separating arrangement as claimed in claim 1, wherein the separating arrangement is fastened releasably to the bodywork.

9. The separating arrangement as claimed in claim 5, wherein the separating arrangement is fashioned from a magnesium diecasting.

10. The separating arrangement as claimed in claim 2, wherein the separating arrangement is fastened directly to the vehicle bodywork.

11. The separating arrangement as claimed in claim 3, wherein the separating arrangement is fastened directly to the vehicle bodywork.

12. The separating arrangement as claimed in claim 2, wherein the separating arrangement is fashioned from a light metal diecasting.

13. The separating arrangement as claimed in claim 12, wherein the separating arrangement is fashioned from a magnesium diecasting.

14. The separating arrangement as claimed in claim 3, wherein the separating arrangement is fashioned from a light metal diecasting.

15. The separating arrangement as claimed in claim 14, wherein the separating arrangement is fashioned from a magnesium diecasting.

16. The separating arrangement as claimed in claim 4, wherein the separating arrangement is fashioned from a light metal diecasting.

17. The separating arrangement as claimed in claim 16, wherein the separating arrangement is fashioned from a magnesium diecasting.

18. The separating arrangement as claimed in claim 2, wherein a wall thickness between the reinforcing struts is less than 1.5 mm.

19. The separating arrangement as claimed in claim 3, wherein a wall thickness between the reinforcing struts is less than 1.5 mm.

20. The separating arrangement as claimed in claim 4, wherein a wall thickness between the reinforcing struts is less than 1.5 mm.

21. The separating arrangement as claimed in claim 5, wherein a wall thickness between the reinforcing struts is less than 1.5 mm.

22. The separating arrangement as claimed in claim 2, wherein regions between the reinforcing struts are left open.

23. The separating arrangement as claimed in claim 3, wherein regions between the reinforcing struts are left open.

24. The separating arrangement as claimed in claim 4, wherein regions between the reinforcing struts are left open.

25. The separating arrangement as claimed in claim 5, wherein regions between the reinforcing struts are left open.

26. The separating arrangement as claimed in claim 2, wherein the separating arrangement is fastened releasably to the bodywork.

27. The separating arrangement as claimed in claim 3, wherein the separating arrangement is fastened releasably to the bodywork.

28. The separating arrangement as claimed in claim 4, wherein the separating arrangement is fastened releasably to the bodywork.

29. The separating arrangement as claimed in claim 5, wherein the separating arrangement is fastened releasably to the bodywork.

30. The separating arrangement as claimed in claim 6, wherein the separating arrangement is fastened releasably to the bodywork.

31. The separating arrangement as claimed in claim 7, wherein the separating arrangement is fastened releasably to the bodywork.

* * * * *